(12) United States Patent
Jeon et al.

(10) Patent No.: US 12,261,286 B2
(45) Date of Patent: Mar. 25, 2025

(54) NEGATIVE ELECTRODE FOR SECONDARY BATTERY, AND SECONDARY BATTERY INCLUDING SAME

(71) Applicant: SK INNOVATION CO., LTD., Seoul (KR)

(72) Inventors: Chan Young Jeon, Daejeon (KR); Hee Gyoung Kang, Daejeon (KR); So Hyun Park, Daejeon (KR); Hae Suk Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 359 days.

(21) Appl. No.: 17/572,484

(22) Filed: Jan. 10, 2022

(65) Prior Publication Data
US 2022/0271271 A1    Aug. 25, 2022

(30) Foreign Application Priority Data

Feb. 23, 2021  (KR) .................. 10-2021-0024079

(51) Int. Cl.
*H01M 4/36*  (2006.01)
*H01M 4/133* (2010.01)
(Continued)

(52) U.S. Cl.
CPC .......... *H01M 4/364* (2013.01); *H01M 4/133* (2013.01); *H01M 4/587* (2013.01); *H01M 4/625* (2013.01);
(Continued)

(58) Field of Classification Search
CPC ...... H01M 4/364; H01M 4/133; H01M 4/587; H01M 4/625; H01M 10/0525;
(Continued)

(56) References Cited

U.S. PATENT DOCUMENTS

| 10,050,259 B2 * | 8/2018 | Shim ................. H01M 10/0525 |
| 2008/0248387 A1 * | 10/2008 | Hinoki .............. H01M 10/4235 |
| | | 429/209 |

(Continued)

FOREIGN PATENT DOCUMENTS

| CA | 2807015 A1 * | 2/2012 | ............ H01M 4/133 |
| CN | 111403705 A * | 7/2020 | |

(Continued)

OTHER PUBLICATIONS

Tuan-Tu Nguyen et al., The electrode tortuosity factor: why the conventional tortuosity factor is not well suited for quantifying transport in porous Li-ion battery electrodes and what to use instead, Nature Partner Journals, 2020, p. 1-12, the Shanghai Institute of Ceramics of the Chinese Academy of Sciences.

(Continued)

*Primary Examiner* — James M Erwin
*Assistant Examiner* — Kevin Nguyen
(74) *Attorney, Agent, or Firm* — IP & T GROUP LLP

(57) ABSTRACT

Provided is a negative electrode for a secondary battery including: a current collector, and a negative electrode active material layer formed on the current collector and containing a first negative electrode active material having a large particle size and a second negative electrode active material having a small particle size, wherein the second negative electrode active material is contained in an amount of 10% by weight or less based on the total weight of the negative electrode active material, and the following Relational Equation 1 is satisfied: [Relational Equation 1] $0.4<D2/D1<0.7$; wherein D1 and D2 are the particle sizes (D50, μm) of the first and second negative electrode active materials, respectively.

11 Claims, 1 Drawing Sheet

(51) Int. Cl.
  *H01M 4/587* (2010.01)
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/027* (2013.01)

(58) Field of Classification Search
  CPC ..... H01M 2004/021; H01M 2004/027; H01M 4/362; H01M 4/583; H01M 10/052; H01M 4/366; Y02E 60/10
  USPC ........................................................ 429/229
  See application file for complete search history.

(56) References Cited

U.S. PATENT DOCUMENTS

| | | | |
|---|---|---|---|
| 2013/0143127 A1* | 6/2013 | Nakamura | H01M 4/366 |
| | | | 429/231.8 |
| 2017/0179487 A1 | 6/2017 | Takeda et al. | |
| 2019/0074516 A1* | 3/2019 | Oh | H01M 4/386 |
| 2019/0326600 A1* | 10/2019 | Park | H01M 4/625 |
| 2020/0185719 A1 | 6/2020 | Piao et al. | |
| 2020/0243897 A1* | 7/2020 | Senoue | H01M 10/0525 |

FOREIGN PATENT DOCUMENTS

| | | | | |
|---|---|---|---|---|
| CN | 111554899 A | | 8/2020 | |
| JP | 4579892 B2 | | 11/2010 | |
| JP | 4665931 B2 * | | 4/2011 | ........ H01M 10/0525 |
| KR | 10-2020-0047286 A | | 5/2020 | |

OTHER PUBLICATIONS

Extended European Search Report for the European Patent Application No. 22155473.6 issued by the European Patent Office on Jun. 27, 2022.

* cited by examiner

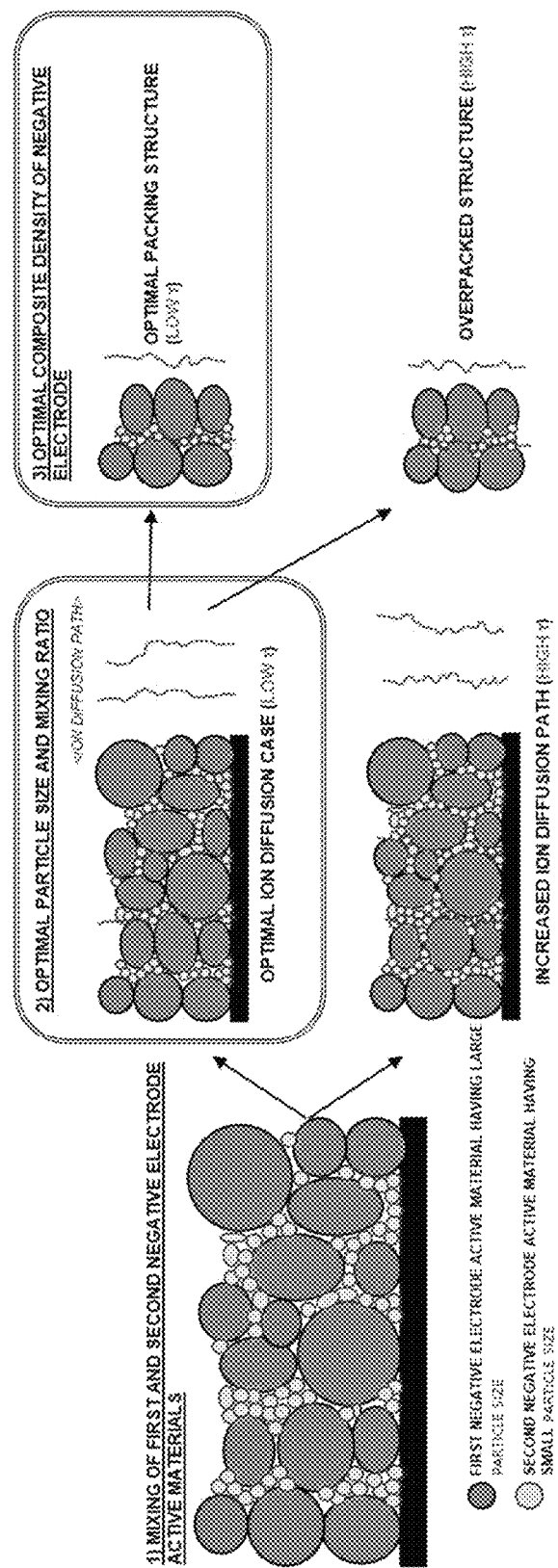

NEGATIVE ELECTRODE FOR SECONDARY BATTERY, AND SECONDARY BATTERY INCLUDING SAME

CROSS-REFERENCE TO RELATED APPLICATIONS

This application claims priority under 35 U.S.C. § 119 to Korean Patent Application No. 10-2021-0024079, filed on Feb. 23, 2021, in the Korean Intellectual Property Office, the disclosure of which is incorporated herein by reference in its entirety.

TECHNICAL FIELD

The following disclosure relates to a negative electrode for a secondary battery and a secondary battery including the same.

BACKGROUND ART

Recently, in accordance with an increase in a demand for electronic devices such as mobile devices, the development of technologies for weight reduction and miniaturization of an electrochemical battery (secondary battery) for increasing portability of the electronic devices has been expanded. In addition to such a trend, in accordance with a global trend toward tightening regulations on fuel efficiency and exhaust gas of automobiles, the growth of an electric vehicle (EV) market has been accelerated, such that the development of a high-output and large-capacity lithium secondary battery to be used in such electric vehicles has been demanded.

In order to achieve high-output of the lithium secondary battery, it is advantageous to increase a specific surface area by using a negative electrode active material having a small particle size.

However, a large specific surface area is advantageous for output characteristics, but it is also a cause of capacity loss of the battery because it means that there are many sites where side reactions occur. In particular, this problem occurs more seriously during a repeated high-rate charge/discharge process, thereby significantly reducing cycle characteristics of the battery. Accordingly, there is a need to develop a negative electrode capable of solving the above-described problems while being able to express high-output characteristics according to the use of a negative electrode active material having a small particle size.

DISCLOSURE

Technical Problem

An embodiment of the present invention is directed to improve high-output characteristics of a negative electrode by efficiently expressing the output characteristics according to the use of a negative electrode active material having a small particle size.

Technical Solution

In one general aspect, there is provided a negative electrode for a secondary battery including: a current collector, and a negative electrode active material layer formed on the current collector and containing a first negative electrode active material having a large particle size and a second negative electrode active material having a small particle size, wherein the second negative electrode active material is contained in an amount of 10% by weight or less based on the total weight of the negative electrode active material, and the following Relational Equation 1 is satisfied:

$$0.4 < D2/D1 < 0.7; \qquad \text{[Relational Equation 1]}$$

wherein D1 and D2 are particle sizes (D50, μm) of the first and second negative electrode active materials, respectively.

The first negative electrode active material may be artificial graphite, natural graphite, or combinations thereof.

The second negative electrode active material may be artificial graphite.

The second negative electrode active material may include a secondary particle formed by granulating a primary particle.

In the second negative electrode active material, the primary particle may have a particle size (D50) of 1 to 4 μm, and the secondary particle may have a particle size (D50) of 2 to 6 μm.

The second negative electrode active material may include an amorphous carbon coating layer formed on the secondary particle.

The amorphous carbon coating layer may have a thickness of 5 to 100 nm.

The second negative electrode active material may be contained in an amount of 0.5 to 10% by weight based on the total weight of the negative electrode active material.

The negative electrode may further satisfy the following Relational Equation 2:

$$0.5 < D2/D1 < 0.7; \qquad \text{[Relational Equation 2]}$$

wherein D1 and D2 are particle sizes (D50, μm) of the first and second negative electrode active materials, respectively.

The negative electrode may further satisfy the following Relational Equation 3:

$$3 < \tau < 6; \qquad \text{[Relational Equation 3]}$$

wherein τ is tortuosity of the negative electrode.

The negative electrode may have a composite density of less than 1.7 g/cc.

The negative electrode may have a composite density of 1.4 to 1.6 g/cc.

In another general aspect, there is provided a secondary battery: including the negative electrode as described above; a positive electrode; a separator; and an electrolyte.

Advantageous Effects

The negative electrode for a secondary battery according to the present invention has an advantage of exhibiting excellent output characteristics while reducing the problems of irreversible capacity loss and long-term performance deterioration by using a small amount of a negative electrode active material having a small particle size.

BRIEF DESCRIPTION OF THE DRAWINGS

FIG. 1 is a view illustrating a packing structure of a negative electrode according to an embodiment of the present invention.

DETAILED DESCRIPTION OF EMBODIMENTS

Various advantages and features of the present invention and methods accomplishing them will become apparent from the following detailed description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims. Hereinafter, detailed contents for carrying out the present invention will be described in detail with reference to the accompanying drawings. Throughout the drawings, the same reference numbers denote the same components, and "and/or" includes each and all of one or more combinations of the mentioned items.

Unless defined otherwise, all terms (including technical and scientific terms) used in the present specification have the same meaning as meanings commonly understood by those skilled in the art to which the present invention pertains. Throughout the present specification, unless described to the contrary, "including" any component will be understood to imply the inclusion of other elements rather than the exclusion of other elements. In addition, a singular form includes a plural form unless specially described in the text.

In the present specification, when an element such as a layer, a film, a region, or a plate is referred to as being "on" another element, it may be directly on another element or may be on another element with the other element interposed therebetween.

In the present specification, the particle size may refer to D50, and the D50 refers to a particle size when a cumulative volume becomes 50% from a small particle size in a particle size distribution measurement by a laser scattering method. Here, the D50 may be obtained by measuring the particle size distribution using a Mastersizer3000 (Malvern) by taking samples according to a KS A ISO 13320-1 standard. Specifically, ethanol may be used as a solvent and, if necessary, dispersion may be performed using an ultrasonic disperser, and then, a volume density may be measured.

The present invention provides a negative electrode for a secondary battery, including: a current collector, and a negative electrode active material layer formed on the current collector and containing a first negative electrode active material having a large particle size and a second negative electrode active material having a small particle size, wherein the second negative electrode active material is contained in an amount of 10% by weight or less based on the total weight of the negative electrode active material, and the following Relational Equation 1 is satisfied:

$$0.4 < D2/D1 < 0.7;\quad\text{[Relational Equation 1]}$$

wherein D1 and D2 are particle sizes (D50, μm) of the first and second negative electrode active materials, respectively.

The negative electrode active material having a small particle size has a large specific surface area, so that intercalation/deintercalation of lithium ions in the negative electrode may be effectively performed, and thus, the output characteristics of the negative electrode may be improved. However, as a side reaction site is also increased due to the large specific surface area, the capacity of the secondary battery is reduced and the battery performance is degraded according to the cycle.

In the present invention, the negative electrode active material having a small particle size may be contained in an amount of 10% by weight or less based on the total weight of the negative electrode active material to reduce capacity and suppress performance degradation caused by an increase in the above-described side reactions, and high-output characteristics may be improved by optimizing a packing structure of the negative electrode.

In the negative electrode active material for a secondary battery according to an embodiment of the present invention, the second negative electrode active material having a small particle size may be artificial graphite. A relatively high-density electrode may be manufactured due to the high particle strength of artificial graphite. Thus, a capacity density per volume of the negative electrode may be increased and it may contribute to improving the lifespan characteristics of the battery, which is preferable. However, the present invention is not necessarily limited thereto.

In the negative electrode active material for a secondary battery according to an embodiment of the present invention, the second negative electrode active material having a small particle size may include a secondary particle formed by granulating an artificial graphite primary particle. Here, the primary particle refers to an original particle when a different type of particle is formed from a certain particle, and a plurality of primary particles may be aggregated, bound, or granulated to form secondary particles.

The secondary particles refer to physically distinguishable large particles formed by aggregation, bonding, or granulation of individual primary particles. The assembly of the primary particle refers to a process in which the primary particles become secondary particles by forming an aggregate consisting of a plurality of primary particles that spontaneously or artificially aggregate or agglomerate, and may be used interchangeably with terms such as aggregation or bonding.

In the second negative electrode active material, the primary particle may have a particle size (D50) of 1 to 4 μm, and the secondary particle may have a particle size (D50) of 2 to 6 μm, preferably 4 to 6 μm.

The second negative electrode active material may include an amorphous carbon coating layer formed on the secondary particles. Here, the second negative electrode active material may be prepared through an amorphous carbon coating process after pulverizing the granulated secondary particles.

A method of coating the amorphous carbon on a surface of the secondary particles may be carried out through a method commonly known in the art. As a non-limiting example, it may be prepared by attaching or coating an amorphous carbon precursor material to the secondary particles and then performing heat treatment. Specifically, the amorphous carbon precursor material may be one or more selected from the group consisting of petroleum heavy oil and pitch oil.

In terms of increasing conductivity of the secondary particles, the amorphous carbon coating layer may have a thickness of 5 to 100 nm, preferably 5 to 50 nm.

In the negative electrode active material for a secondary battery according to an embodiment of the present invention, the first negative electrode active material having a large particle size may be artificial graphite, natural graphite, or combinations thereof.

The negative electrode active material layer further includes a binder, and the binder may be a water-soluble binder. Specifically, the water-soluble binder may be styrene-butadiene rubber, acrylated styrene-butadiene rubber, polyvinyl alcohol, sodium polyacrylate, a copolymer of propylene and an olefin having 2 to 8 carbon atoms, polyacrylamide, a copolymer of (meth)acrylic acid and (meth) acrylic acid alkylester, or combinations thereof.

In a case where the water-soluble binder is used, the water-soluble binder may bind the electrode active material to the current collector without affecting the viscosity of the slurry, but the slurry may be easily gelled due to the fine particles of the electrode active material and the conductive material. Therefore, a thickener for making the slurry stable by imparting viscosity to the slurry may be further included. As an example, the thickener may be a cellulose-based compound, specifically, carboxymethyl cellulose, hydroxypropylmethyl cellulose, methyl cellulose, or one or more mixtures of alkali metal salts thereof. As the alkali metal, Na, K, or Li may be used.

The negative electrode active material layer may further include a conductive material. The conductive material is used to impart conductivity to the negative electrode, and is not particularly limited as long as it is a conventional electrically conductive material that does not cause a chemical change in the secondary battery. As an example, the conductive material may be natural graphite, artificial graphite, carbon black, acetylene black, ketjen black, carbon fiber, carbon nanotube, and combinations thereof, but is not limited thereto.

The current collector may be one selected from the group consisting of copper foil, nickel foil, stainless steel foil, titanium foil, nickel foam, copper foam, a polymeric substrate coated with a conductive metal, and combinations thereof, but is not limited.

The negative electrode for a secondary battery according to the present invention is characterized in that the particle sizes of the first and second negative electrode active materials satisfy the following Relational Equation 1:

$$0.4<D2/D1<0.7; \quad \text{[Relational Equation 1]}$$

wherein D1 and D2 are the particle sizes (D50, μm) of the first and second negative electrode active materials, respectively.

In the negative electrode active material for a secondary battery of the present invention, as D2/D1 is adjusted to the above range, the second negative electrode active material having a small particle size may be packed with high density between the first negative electrode active materials having a large particle size to suppress the problem of expanding a lithium ion diffusion path, and high-output characteristics due to the large specific surface area of the second negative electrode active material having a small particle size may be maximized.

In terms of having a pore structure of the negative electrode for smooth lithium ion diffusion by lowering tortuosity of the negative electrode by having the first and second negative electrode active materials have an optimized packing structure, the negative electrode may further satisfy the following Relational Equation 2: Here, the second negative electrode active material may have a particle size (D2) of 2 to 6 μm, preferably 4 to 6 μm.

$$0.5<D2/D1<0.7; \quad \text{[Relational Equation 2]}$$

wherein D1 and D2 are the particle sizes (D50, μm) of the first and second negative electrode active materials, respectively.

The tortuosity is an indicator that may indicate the "flow through" properties in the porous material, and means that the lower the value, the more the flowability of the porous material increases, so that the transport material such as ions may pass through the porous material more smoothly. Meanwhile, the tortuosity may be reduced by lowering factors such as thickness or density of the negative electrode, but in this case, the capacity characteristics of the negative electrode may be reduced.

In the present invention, as described above, a particle size ratio (D2/D1) of the first and second negative electrode active materials is adjusted and the content of the second negative electrode active material (small particle size) is adjusted to 10% by weight or less based on the total weight of the negative electrode active material to form an optimized negative electrode packing structure, and thus, it is possible to improve the high-output characteristics by reducing the tortuosity without the above-described capacity reduction.

Specifically, the second negative electrode active material may be contained in an amount of 10% by weight or less, preferably 0.5 to 10% by weight, and more preferably 1 to 10% by weight based on the total weight of the negative electrode active material. If the content of the second negative electrode active material exceeds 10% by weight, an irreversible capacity loss may occur due to an increase in side reactions due to an increase in specific surface area, and excessive packing may occur between the first negative electrode active material in the negative electrode, thereby increasing diffusion resistance according to the expansion of the lithium ion diffusion path. On the other hand, if the content of the second negative electrode active material is less than 0.5% by weight, the effect of high-output is insignificant.

The negative electrode active material according to an embodiment of the present invention may exhibit a pellet density of 1.5 g/cc or more, specifically 1.5 to 1.67 g/cc, by including the second negative electrode active material having a small particle size in the above-described content range. A high pellet density value under the same pressure condition means that the particles of the active material in the negative electrode are well packed, thereby reducing the stress on the particles of the active material when pressure is applied.

The pellet density is a pellet density (g/cc) of the negative electrode active material measured by pressing the negative electrode active material including the first and second negative electrode active materials at 2 kN/cm². Specifically, the pellet density (Dp) may be calculated by putting 2 g (W) of the negative electrode active material into a pelletizer circular mold having a diameter of 20 mm (D), pressing the negative electrode active material at 6.28 kN for 10 seconds, releasing the pressure, measuring a height (H2) of the pelletizer, and using the following Relational Equation to calculate the pellet density of the negative electrode active material.

$$D_P = W/[\pi \times (D/2)^2 \times (H_2 - H_1)/1000]$$

wherein W is an input amount (g) of the negative electrode active material, D is a diameter (mm) of the pelletizer mold, and $H_1$ and $H_2$ are the heights (mm) of the pelletizer before and after pressurization, respectively.

The negative electrode may satisfy Relational Equation 3 below:

$$3<\tau<6; \quad \text{[Relational Equation 3]}$$

wherein τ is the tortuosity of the negative electrode.

Specifically, the tortuosity (τ) of the negative electrode may be calculated by the following Relational Equation:

$$\tau = (R_{ion} \times A \times \kappa \times \varepsilon)/d$$

wherein $R_{ion}$ is an ionic diffusion resistance (Ohm) according to the impedance analysis, A is an area of the negative electrode (cm²), κ is an ionic conductivity of an electrolyte (mS/cm), ε is the porosity of the negative electrode, and d is a thickness of the negative electrode (μm).

The tortuosity (τ) of the negative electrode may be 3 to 6, preferably 5 to 6. The lower the tortuosity of the negative electrode, the higher the lithium ion diffusion rate, which is advantageous for improving high-rate performance. However, the electrode (negative electrode) has a structure in which different particles are packed, and it is difficult to extremely reduce the tortuosity of the electrode under a composite density condition of a specific electrode. As a non-limiting example, if the composite density of the electrode is 1.4 g/cc or more, it is very difficult to realistically lower the tortuosity of the negative electrode to 3 or less.

Meanwhile, the composite density of the negative electrode for a secondary battery according to an embodiment of the present invention may be less than 1.7 g/cc, specifically 1.4 to 1.6 g/cc. While it is possible to satisfy the high capacity of the negative electrode in the above range and express an excellent packing structure of the negative electrode, thereby increasing the output characteristics.

According to one embodiment of the present invention, the composite density of the negative electrode for a secondary battery may satisfy 1.4 to 1.6 g/cc. In the case of the negative electrode containing the negative electrode active material having a small particle size and a large particle size according to the present invention and having a composite density within the above range, a relatively more excellent pore structure in the negative electrode may be formed, and thus a smoother lithium ion diffusion path may be provided, thereby significantly improving high-output characteristics.

FIG. 1 is a view illustrating a packing structure of a negative electrode according to an embodiment of the present invention. When manufacturing the negative electrode of the composite density by using the negative electrode active material including a particle size ratio and a mixing ratio of the first and second negative electrode active materials optimized according to an embodiment of the present invention, the smooth lithium ion diffusion path may be provided by forming an excellent packing structure in the negative electrode. Therefore, it is possible to significantly improve the high-output characteristics.

The present invention also provides a secondary battery including: a negative electrode according to an embodiment of the present invention; a positive electrode; a separator interposed between the negative electrode and the positive electrode; and an electrolyte.

The positive electrode may include a current collector and a positive electrode active material layer positioned on the current collector. A material of the current collector may be aluminum or copper, etc., but is not limited thereto.

The positive electrode active material may be used without limitation as long as it is a positive electrode active material generally used. As an example, the positive electrode active material may be a composite oxide of a metal selected from cobalt, manganese, nickel, and combinations thereof and lithium, but is not limited thereto.

The separator is not particularly limited as long as it is a separator known in the art. For example, the separator may be selected among glass fiber, polyester, polyethylene, polypropylene, polytetrafluoroethylene, or a combination thereof, may be in the form of a non-woven fabric or a woven fabric, and may optionally be used in a single-layer or multi-layer structure.

The electrolyte includes a non-aqueous organic solvent and an electrolytic salt. The non-aqueous organic solvent may be ethylene carbonate (EC), propylene carbonate (PC), dimethyl carbonate (DMC), diethyl carbonate (DEC), ethylmethyl carbonate (EMC), 1,2-dimethoxyethane (DME), γ-butyrolactone (BL), tetrahydrofuran (THF), 1,3-dioxolane (DOL), diethyl ester (DEE), methyl formate (MF), methyl propionate (MP), sulfolane (S), dimethyl sulfoxide (DMSO), acetonitrile (AN), or a mixture thereof, but is not limited thereto. The electrolytic salt is a material dissolved in the non-aqueous organic solvent, acting as a supply source of electrolytic metal ions in the secondary battery to enable a basic operation of the secondary battery, and promoting movement of the electrolytic metal ions between the positive electrode and the negative electrode. As a non-restrictive example, in a case where an electrolytic metal is lithium, the electrolytic salt may be $LiPF_6$, $LiBF_4$, LiTFSI, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (here, x and y are natural numbers), LiCl, LiI, or a mixture thereof, but is not limited thereto. In addition, the electrolyte salt may be a known material used in a concentration suitable for the purpose, and may further, if necessary, include a known solvent or additive in order to improve charging/discharging characteristics, flame-retardant characteristics, etc.

Hereinafter, preferred examples and comparative examples of the present invention will be described. However, the following examples are only a preferred example of the present invention, and the present invention is not limited to the following examples.

EXAMPLES

Example 1

Step 1: Preparation of Negative Electrode Active Material

The needle coke was pulverized using a jet mill and then sieved to obtain a powder. The powder was heat-treated in an argon atmosphere at 3000° C. for 20 hours to prepare artificial graphite primary particles having an average particle size (D50) of 2.5 μm.

Next, the artificial graphite primary particles and the pitch were mixed in a ratio of 95:5 and then heat-treated at 600° C. for 10 hours to prepare secondary particles in which the primary particles were granulated. Then, heat treatment was performed at 1200° C. for 10 hours using pitch as a coating agent to prepare secondary particles coated with amorphous carbon having an average thickness of 30 nm. The amount of pitch added thereto may be adjusted by calculating based on the mass increase of the secondary particles after performing the heat treatment. Here, the artificial graphite secondary particles on which the amorphous carbon coating layer is formed have an average particle size (D50) of 6 μm.

A negative electrode active material was prepared by mixing the artificial graphite secondary particles and natural graphite having an average particle size of 10 μm in a weight ratio of 1:9.

Step 2: Manufacture of Negative Electrode

Water was added to 97.6% by weight of the negative electrode active material, 1.5% by weight of a SBR binder, and 1.2% by weight of a CMC, and mixed at room temperature for 120 minutes to prepare a slurry. The prepared slurry was applied to a Cu foil current collector, dried, and then roll pressed so that the composite density of the negative electrode was 1.67 g/cc to manufacture a negative electrode.

Step 3: Manufacture of Half-Cell

A CR2016 coin cell was fabricated by disposing the manufactured negative electrode and a lithium metal positive electrode, interposing a PE separator between the negative electrode and the positive electrode, and then injecting an electrolyte. A half-cell was manufactured by resting the assembled coin cell at room temperature for 24 hours. Here, an electrolyte, which is prepared by mixing with 1.0 M $LiPF_6$ as a lithium salt in an organic solvent (EC:EMC=1:4 by volume), and then mixing with 2% by volume of a FEC as an electrolyte additive, was used.

Physical Properties Evaluation

1) Measurement of Pellet Density ($D_P$) of Negative Electrode Active Material

The manufactured negative electrode active material was placed in a container and pressurized at a constant pressure to measure a volume change at this time. After measuring the volume change at this time by pressurizing the sample of 2±0.1 g to 2.0 kN, the pellet density of the sample was calculated, and the result is shown in Table 1 below. A method for measuring a pellet density and the Calculation Equation are as follows.

[Pellet Density Measurement Method]
   a) Measure a height of the empty pelletizer (Height gauge, $H_1$, mm).
   b) Put about 2±0.1 g (W, g) of the sample into a sample inlet of the pelletizer, and be careful not to let the sample flow down or leak out of the pelletizer.
   c) Place the pelletizer in the center of a manual type presser.
   d) Apply pressure by pulling a lever of a manual type presser while checking a gauge until the pressure becomes 2.0 metric ton.
   e) Release the pressure after 10 seconds of pressurization. Then, carefully take out the pelletizer and measure the height ($H_2$, mm).

[Pellet Density Calculation Equation]

$$\text{Pellet density} = W/[\pi \times (20/2)^2 \times (H_2 - H_1)/1000], \text{Diameter of hole of pelletizer: 13 mm}$$

2) Negative Electrode Tortuosity ($\tau$) Evaluation

A symmetric coin cell in which the manufactured negative electrode was applied as both of a working electrode and a counter electrode was fabricated. Here, an electrolyte, which is prepared by mixing with 1.0 M $LiPF_6$ as a lithium salt in an organic solvent (EC:EMC=1:4 by volume), and then mixing with 1% by volume of a FEC as an electrolyte additive, was used.

Then, impedance spectroscopy (frequency range from 500 KHz to 100 mHz) was performed on the fabricated symmetric electrode. After expressing the result as a Nyquist plot, the tortuosity was calculated through data analysis, and the results are shown in Table 1 below. The Calculation Equation is as follows.

[Tortuosity Calculation Equation]

$$\text{Tortuosity}(\tau) = R_{ion} \times A \times \kappa \times \varepsilon / d$$

($R_{ion}$: ionic diffusion resistance, A: electrode area, $\kappa$: ionic conductivity of electrolyte, $\varepsilon$: porosity, d: thickness)

Evaluation Example

[Evaluation Example 1]: Negative Electrode Tortuosity ($\tau$) Evaluation Depending on Mixing Ratio of Negative Electrode Active Materials Having Small and Large Particle Sizes Example 2 and Comparative Examples 1 to 3

The negative electrode was manufactured in the same manner as in Example 1, except that the negative electrode active material having a mixing ratio (weight ratio) of a small particle size and a large particle size shown in Table 1 was used.

Comparative Example 4

The negative electrode active material was prepared in the same manner as in Example 1, except that natural graphite having an average particle size of 20 μm was used instead of natural graphite having an average particle size of 10 μm as a negative electrode active material having a large particle size.

Comparative Example 5

The negative electrode active material was prepared in the same manner as in Example 1, except that natural graphite having an average particle size of 8 μm was used instead of natural graphite having an average particle size of 10 μm as a negative electrode active material having a large particle size.

TABLE 1

| | Negative electrode active material | | | Negative electrode | |
|---|---|---|---|---|---|
| | Particle size ratio (D2/D1) of small particle size:large particle size | Mixing ratio (weight ratio) of small particle size:large particle size | Pellet density ($D_p$, g/cc) | Composite density (g/cc) | τ |
| Example 1 | 0.6 | 1:9 | 1.52 | 1.67 | 5.97 |
| Example 2 | 0.6 | 0.5:9.5 | 1.52 | 1.67 | 5.99 |
| Comparative Example 1 | 0.6 | 0:10 | 1.48 | 1.67 | 7.87 |
| Comparative Example 2 | 0.6 | 1.5:8.5 | 1.49 | 1.67 | 6.49 |
| Comparative Example 3 | 0.6 | 2:8 | 1.48 | 1.67 | 6.32 |
| Comparative Example 4 | 0.3 | 1:9 | 1.57 | 1.67 | 6.87 |
| Comparative Example 5 | 0.75 | 1:9 | 1.49 | 1.67 | 6.41 |

Referring to Table 1, Examples 1 to 2 and Comparative Examples 1 to 5 were all negative electrodes manufactured at a composite density of 1.67 g/cc, and negative electrode active materials having a mixing ratio of different small and large particle sizes or a particle size ratio were used. However, as a result of manufacturing a negative electrode using the active material, it could be confirmed that the tortuosity of the negative electrode of each Example and Comparative Example was different. It is analyzed that such a result is because a packing structure in the negative electrode is different.

Specifically, it can be confirmed that Examples satisfying the mixing ratio of the negative electrode active material having a small particle size and a large particle size of the present invention showed a high pellet density (Dp) and a low tortuosity compared to the Comparative Examples that did not satisfy the mixing ratio, such that a pore structure in the negative electrode was improved. The pore structure in the negative electrode may be improved by packing the active material in the negative electrode well so that the pressure on the active material particles is reduced during the rolling process, and thus a deformation degree of the particles is reduced. If the pore structure in the negative electrode is improved, the lithium ion diffusion path in the negative electrode may be expanded or the formation of dead-end pores caused by excessive deformation of the active material particles may be suppressed, which is particularly advantageous for high-rate charging performance. On the other hand, it was considered that Comparative Examples 1 to 3 that do not satisfy the above mixing ratio exhibited a high negative electrode tortuosity caused by the deformation of the active material particles in a negative electrode manufacturing process (a rolling process) due to the low pellet density under a composite density condition of 1.67 g/cc.

Meanwhile, even if the mixing ratio of the small particle size and the large particle size of the present invention is satisfied, if the particle size ratio of the small particle size: the large particle size in the negative electrode active material does not satisfy Relational Expression 1 of the present invention (Comparative Examples 4 to 5), the pore structure is poor compared to the Examples. Specifically, if the particle size ratio (D2/D1) of the small particle size: the large particle size in the negative electrode active material is less than 0.4, the particles having the small particle size are positioned between the particles having the large particle size to expand the lithium ion diffusion path (increase in tortuosity), which may adversely affect the pore structure in the negative electrode. On the other hand, if the particle size ratio (D2/D1) of the small particle size: the large particle size in the negative electrode active material exceeds 0.7, a difference in particle size between the small particle size and the large particle size is reduced. Thus, it is difficult to form the smooth diffusion path of lithium ions because packing is not performed well in the negative electrode, and furthermore, it may cause a decrease in high-output performance due to a decrease in specific surface area.

[Evaluation Example 2]: Evaluation of Negative Electrode Tortuosity (τ) and High-Rate Charging Performance According to Composite Density of Negative Electrode Examples 3~5

The negative electrode was manufactured in the same manner as in Example 1, except that the negative electrode having the composite density described in Table 2 was manufactured.

Comparative Example 6

The negative electrode active material was prepared in the same manner as in Example 1, except that the negative electrode active material was prepared using only natural graphite (average particle size of 10 μm) having a large particle size without using secondary particles of artificial graphite having a small particle size.
(Evaluation Method)
High-Rate Charging Characteristics Evaluation of Half-Cell The half-cells manufactured in Examples 1, 3-5 and Comparative Example 6 were charged and discharged at a low-rate (0.1 C) during the initial 3 to 5 cycles to stabilize the electrode, and then charged at a high-rate (2 C) to evaluate the high-rate charging performance. The results are shown in Table 2 below is shown. In this case, the high-rate filling rate (%) was calculated by measuring the high-rate charging amount compared to the low-rate charging amount.

TABLE 2

| | Mixing ratio (weight ratio) of small particle size:large particle size | Pellet density ($D_p$, g/cc) | Composite density (g/cc) | τ | Charging efficiency (%) |
|---|---|---|---|---|---|
| Example 1 | 1:9 | 1.52 | 1.67 | 5.97 | 92.4 |
| Example 3 | 1:9 | 1.52 | 1.43 | 5.62 | 96.4 |
| Example 4 | 1:9 | 1.52 | 1.59 | 5.14 | 98.5 |
| Example 5 | 1:9 | 1.52 | 1.63 | 5.89 | 90.6 |
| Comparative Example 6 | 0:10 | 1.48 | 1.67 | 7.87 | 80 |

Referring to Table 2, it can be confirmed that when the negative electrode active material satisfying the mixing ratio of the small particle size and the large particle size of the present invention was used, the pellet density of the same negative electrode active material was exhibited, but a negative electrode tortuosity was different depending on the composite density of the negative electrode.

Specifically, Examples 3 and 4 in which the composite density of the negative electrode is less than 1.6 g/cc exhibited an excellent packing structure compared to Examples 1 and 5, and a significant effect caused by this can be confirmed from the high-rate charging performance results. It was determined that if the negative electrode active material that satisfies the mixing ratio of the small particle size and the large particle size of the present invention is included, a relatively more excellent pore structure is formed in the negative electrode when the composite density of the negative electrode is less than 1.6 g/cc, such that a smoother lithium ion diffusion path may be provided, and thus the high-output characteristics are significantly improved.

Meanwhile, in Comparative Example 6, it can be confirmed that the pore structure and high-rate charging performance in the negative electrode were significantly reduced by using only the negative electrode active material having the large particle size, not the bimodal type including the active material having the large particle size and the small particle size.

The invention claimed is:
1. A negative electrode for a secondary battery, comprising: a current collector; and
  a negative electrode active material layer formed on the current collector and containing a first negative electrode active material having a large particle size and a second negative electrode active material having a small particle size,
  wherein the second negative electrode active material includes a secondary particle formed by aggregating a primary particle, wherein in the second negative electrode active material, the primary particle has a particle size (D50) of 1 to 4 μm, and the secondary particle has a particle size (D50) of 2 to 6 μm,
  wherein the second negative electrode active material is contained in an amount of 10% by weight or less based on the total weight of the negative electrode active material, and the following Relational Equation 1 is satisfied:

$0.4<D2/D1<0.7$;  [Relational Equation 1]

wherein D1 and D2 are particle sizes (D50, μm) of the first and second negative electrode active materials, respectively.

2. The negative electrode for a secondary battery of claim 1, wherein the first negative electrode active material is artificial graphite, natural graphite, or combinations thereof.

3. The negative electrode for a secondary battery of claim 1, wherein the second negative electrode active material is artificial graphite.

4. The negative electrode for a secondary battery of claim 1, wherein the second negative electrode active material includes an amorphous carbon coating layer formed on the secondary particle.

5. The negative electrode for a secondary battery of claim 4, wherein the amorphous carbon coating layer has a thickness of 5 to 100 nm.

6. The negative electrode for a secondary battery of claim 1, wherein the second negative electrode active material is contained in an amount of 0.5 to 10% by weight based on the total weight of the negative electrode active material.

7. The negative electrode for a secondary battery of claim 1, wherein the negative electrode further satisfies the following Relational Equation 2:

$0.5<D2/D1<0.7$;  [Relational Equation 2]

wherein D1 and D2 are particle sizes (D50, μm) of the first and second negative electrode active materials, respectively.

8. The negative electrode for a secondary battery of claim 1, wherein the negative electrode further satisfies the following Relational Equation 3:

$3<\tau<6$;  [Relational Equation 3]

wherein τ is tortuosity of the negative electrode.

9. The negative electrode for a secondary battery of claim 1, wherein the negative electrode has a composite density of less than 1.7 g/cc.

10. The negative electrode for a secondary battery of claim 9, wherein the negative electrode has a composite density of 1.4 to 1.6 g/cc.

11. A secondary battery, comprising the negative electrode of claim 1; a positive electrode; a separator; and an electrolyte.

* * * * *